United States Patent [19]

Eddens et al.

[11] 4,347,701
[45] Sep. 7, 1982

[54] POWER SYSTEM FOR LAND VEHICLES

[75] Inventors: Fletcher C. Eddens; Robert S. Moore; Kenneth R. Munkittrick, all of Wilmington, N.C.

[73] Assignee: Tokyo Electric Co., Ltd., Tokyo, Japan

[21] Appl. No.: 136,897

[22] Filed: Apr. 3, 1980

[51] Int. Cl.³ .............................................. F01K 15/02
[52] U.S. Cl. ....................................... 60/413; 60/670; 417/381; 417/399; 417/539; 180/305
[58] Field of Search ............... 180/303, 304, 305, 308; 417/539, 381, 399; 60/670, 667, 595, 414, 668, 659, 413

[56] References Cited

U.S. PATENT DOCUMENTS

| 153,118 | 7/1874 | Rushworth | 60/670 |
| 1,723,874 | 8/1929 | Lunge | 417/517 |
| 3,903,696 | 9/1975 | Carman | 180/305 |
| 4,097,198 | 6/1978 | Herron | 417/401 |

Primary Examiner—H. Jay Spiegel
Attorney, Agent, or Firm—Frishauf, Holtz, Goodman and Woodward

[57] ABSTRACT

A method of converting steam pressure from a boiler into a constant pressure hydraulic fluid working media and system for efficiently utilizing the hydraulically stored energy in a land vehicle or the like. A reciprocating steam piston actuates one or more hydraulic pistons in cylinders without going through a crankshaft or other rotating parts. A means of recuperating kinetic energy from a decelerating vehicle and storing it as pressurized working fluid is provided.

1 Claim, 4 Drawing Figures

| POSITION IN FIG.3 | $P_s$ | $A_s$ | $A_h$ | $P_h$ | $\frac{A_s P_s}{A_h P_h}$ | TAN$\theta$ | $\theta$ |
|---|---|---|---|---|---|---|---|
| A | 300 | 5 | 1 | 3000 | 0.50 | 0.50 | 26.6° |
| B | 210 | 5 | 1 | 3000 | 0.35 | 0.35 | 19.3° |
| C | 95 | 5 | 1 | 3000 | 0.19 | 0.19 | 10.8° |

POWER SYSTEM FOR LAND VEHICLES

SUMMARY OF THE INVENTION

The object of this invention is a device and power system to provide more efficient motive power to the wheels of a land vehicle and to do other shaft work by means of converting steam pressure from a boiler directly into hydraulic working fluid pressure for motors, without going through ordinary rotating engines and pumps. The expansion of steam in this power system works against a movable piston, the resistive forces of which are determined by the shape of a cam into which the linear force from the expanding steam is mechanically directed. By means of varying the shape of the mechanical linkage cam, the performance of the steam expander can be varied.

In ordinary steam engines, it is necessary to connect the piston to a crankshaft and flywheel and to transmit power by means of gears, shafts, pulleys, etc. On the other hand, a powered piston such as a steam or gas driven one connected directly to a second pumping piston would be limited to pumping fluid at some pressure proportional to the decreasing driving media (steam or gas) as it expands and loses pressure. Such an arrangement would not be very efficient or useful. This invention balances the driving and driven fluid pressures by means of a specific mechanical linkage whose mechanical advantage ratio is programmed to suit the pressure curve of the expanding driving gas.

In a preferred embodiment of the invention, hydraulic fluid, pressurized by small cylinders, working off the transferring cam, is fed directly to one or more hydraulic motors through a system of valves and controls arranged to conserve the energy supplied. Energy is conserved when the vehicle is slowing down, because during that time the hydraulic motor is, by the arrangement of valves, made to transfer the kinetic energy of the moving vehicle back into a pressure accumulator to be used later to propel the vehicle.

Energy is directed to the hydraulic motor and in turn to the driving wheels of the vehicle by valving pressurized hydraulic fluid from an accumulator. The steam expander works on demand from the pressure accumulator and is not connected directly to the driving motor. The vehicle coasting energy is also channeled into the accumulator by way of the hydraulic motor itself. The control of driving power is smooth and highly variable at the operator's demand, being capable of exerting horsepower outputs for short periods of time well above the peak horsepower rating of the prime mover itself.

BRIEF DESCRIPTION OF THE DRAWINGS

A description of this invention will be made using reference to the drawings attached, which are a part hereof.

DETAILED DESCRIPTION OF THE INVENTION

Figure 1:
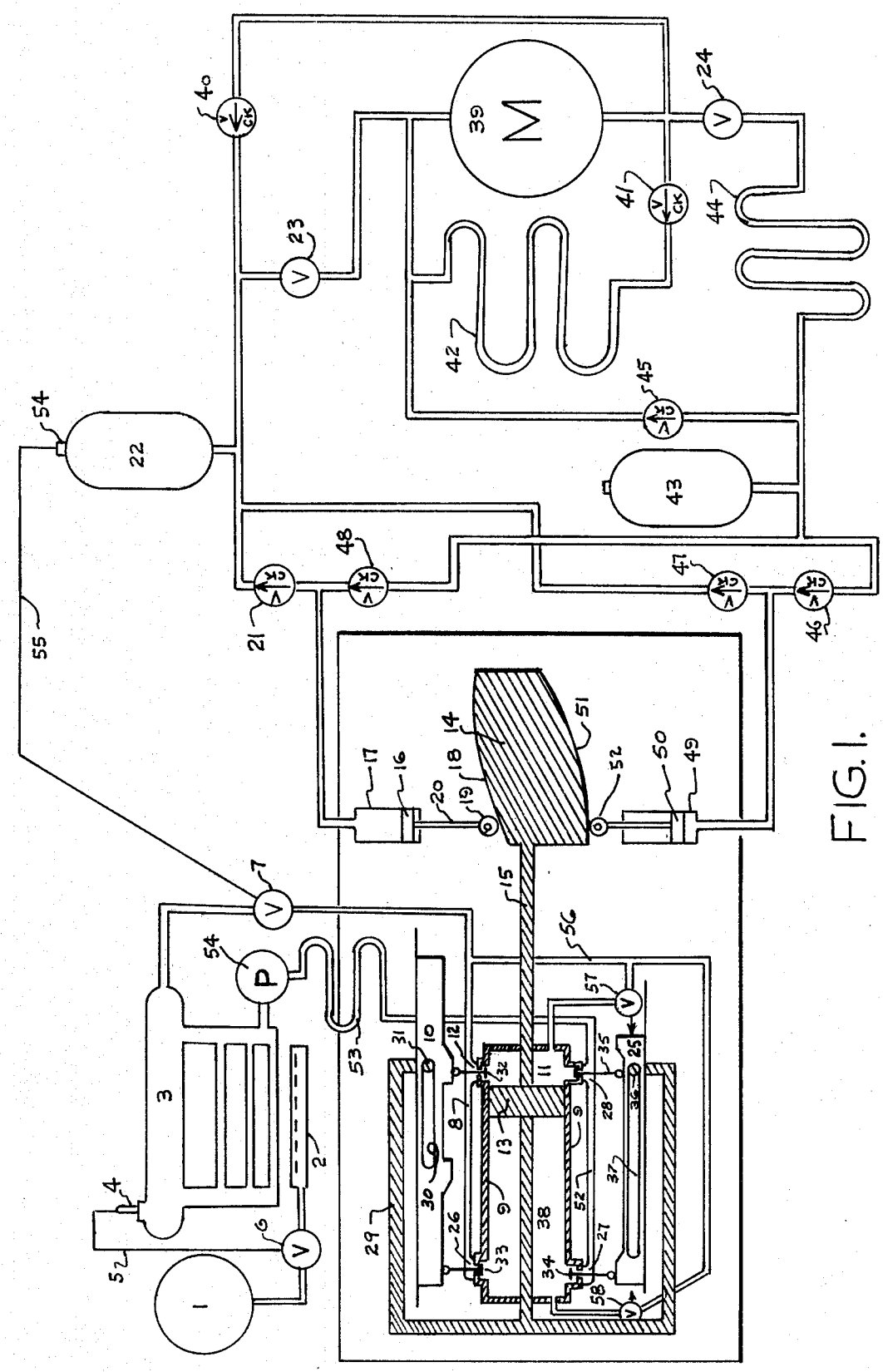
FIG. 1 is a semi-schematic view of a power plant using the steam hydraulic expander and showing valving and control system to transmit power from heat energy to the rotating motor.

Referring to FIG. 1, combustible fuel such as alcohol, oil or butane gas is fed from container 1 to burner 2 and is burned to convert water to steam under pressure in boiler 3. A preset steam pressure in the boiler such as 300 psi, 500 psi, or more is maintained by the feedback control comprised of the pressure transducer 4, impulse tube 5 and valve 6, in the usual manner, by which increased pressure, for example, in the boiler is sensed by the transducer and a valve closing impulse is transmitted to valve 6 reducing the rate of burning in burner 2, thereby tending to lower and hence maintain a constant pressure in the boiler.

Steam from the boiler is throttled through valve 7 to the inlet manifold 8 of the steam expander 9.

When valve slide 10 is in the position shown, to the right in FIG. 1, which is the inlet position for the right cylinder chamber 11, steam enters through port 12 and expands against piston 13, drawing transfer cam 14 to the left by action through piston rod 15. This motion forces piston 16 in hydraulic cylinder 17 upward, in the drawing, by bringing surface 18 of cam 14 to bear against cam roll follower 19, thereby pushing piston rod 20 upward. As piston 16 moves upward, hydraulic fluid in cylinder 17 is forced under pressure through check valve 21 into accumulator 22. Accumulator 22 can be an air over oil type, springloaded, diaphram, or nondiaphram.

The ratio of area of the steam piston 13 to the smaller hydraulic piston 16 is of the order of 5 to 1. Further, the mechanical leverage, or mechanical advantage, of cam 14 and follower 19 is on the order of 2 to 1, rod 20 moving approximately half the distance of rod 15. The combination of these two force ratios make possible very high hydraulic pressures in accumulator 22 as compared to steam pressure in boiler 3. But more importantly to the novel feature of this invention is the fact that the force ratio between 15 and rod 20 is different in different parts of the stroke. This is made possible by the contour of cam face 18 which becomes less steep as piston 13 progresses toward the left in FIG. 1 and toward the end of its leftward stroke.

Consider at this point that valves 23 and 24 are closed so that the system is in a mode building up hydraulic pressure in accumulator 22. This mode is chosen at this point in the description so as to completely describe the novel thermodynamic effect before proceeding on from the accumulator to the remainder of the power system. The steam expander 9 is shown with valve operating slides 10 for inlet and 25 for outlet. Yoke 29 causes pin 31 to move back and forth in slot 30 in slide 10. Slot 30 is slightly shorter than ½ stroke length, therefore yoke 29 and piston 13 move some distance before slide 10 is moved at either end of the stroke. The above described device allows inlet valve 32 to close when the piston 13 is only partway into its power stroke. This early closing of steam inlet is known as "cut-off" and will be referred to later in a description of efficiency.

Outlet valve slide 25 is also caused to move slightly at each end of the piston 13 stroke by means of pin 36 in slot 37. Slot 37 is slightly shorter than a full piston stroke length. Pin 36 is attached to yoke 29 and moves back and forth with the piston 13. The varying sequence is the same as for ordinary steam engines and is as follows:

1. Piston moving from right limit to mid
    inlet 32 open
    inlet 33 closed
    outlet 34 open
    outlet 35 closed
2. Piston moving from mid to left limit
    inlet 32 closed
    inlet 33 closed
    outlet 34 open
    outlet 35 closed
3. Piston moving from left limit to mid
    inlet 32 closed
    inlet 33 open
    outlet 34 closed
    outlet 35 open
4. Piston moving from mid to right limit
    inlet 32 closed
    inlet 33 closed
    outlet 34 closed
    outlet 35 open This type valving will operate as shown but it is to be understood that any system of valving such as external from mechanical linkage, or limit switch solenoid valves, arranged to alternately admit live steam and exhaust spent steam to ports 12 and 26 and from ports 27 and 28 to cause piston 13 to reciprocate, would suffice. The valve slide 10 has dimensions such that steam is admitted to the cylinder chambers 11 and 38 alternately only while the piston 13 is near one of the ends and only for a short distance of its power travel. The steam inlet is then cut off by the inlet valve which is the ordinary method for steam engines. After this "cut off" point, the steam expands adiabatically, changing its thermal energy into mechanical energy in moving the piston. The steam, in so doing, decreases in temperature and decreases in pressure. To accomodate this decrease in pressure against the top area of the steam piston 13 and maintain the same hydraulic pressure on hydraulic piston 16, the mechanical advantage of the linking mechanism must be changed. This change in mechanical advantage is brought about by the fact that the cam face angle 18 changes over its length. For example, if at the beginning of the steam piston stroke the steam pressure is 400 psi and the cam face is angled to provide a 2 to 1 mechanical ratio between forces on shaft 15 to shaft 20, and if steam piston 13 area to hydraulic piston 16 area are in the ratio of 5 to 1, then the hydraulic pressure in cylinder 17 will be $$2 \times 5 \times 400 = 4{,}000 \text{ psi.}$$

In this example, when the steam piston then moves in the cylinder to a place where the expanding steam pressure has decreased from 400 psi to 200 psi, the corresponding position of follower 19 cam face 18, will be in a region where the cam face angle is shaped such to effect a 4 to 1 mechanical advantage. The hydraulic pressure at this latter point of travel in the example will be $$4 \times 5 \times 200 = 4{,}000 \text{ psi.}$$

In this manner, the hydraulic pressure is maintained at 4,000 psi flowing out of cylinder 17, even though the steam pressure in cylinder 11 is decreasing, as it must do to give up its thermal energy efficiently.

To utilize the energy in the form of flowing, high pressure, hydraulic fluid issuing from cylinder 17 as described above, a continuous system of refilling cylinder 17 with low pressure working fluid to be pumped in turn at high pressure, and a hydraulic motor with necessary controls is provided. High pressure hydraulic fluid passes from cylinder 17 through the pass direction of check valve 21 and into pressure accumulator 22. To cause hydraulic motor 39 to rotate, throttle valve 23 is opened by hand, or foot, on demand. Working fluid cannot flow out of accumulator 22 through check valve 40 because of check valve's 40 directionality. Working fluid flows through motor 39 and through valve 24 which is also opened simultaneously with valve 23 because both valves are mechanically tied together such as by having a common operating shaft. The fluid does not at this time go through check valve 41, even though the direction is right, because the spring loaded check opening ball is set at a pressure higher than is in cooler 44 and low pressure accumulator 43. In other words, check valve's 41 crack pressure is set at about 4,200 psi. The fluid, therefore, flows into cooling coil 44. Out of cooling coil 44 the fluid does not flow through check valve 45, because its opening spring is set at a pressure higher than exists in low pressure accumulator 43. The fluid then flows into and past accumulator 43 at a low pressure and on through check valve 46 and into cylinder 49. Fluid does not flow from accumulator 43 through either check valve 47 or check valve 48 because pressure on the arrow side of these valves is higher than in accumulator 43 and the valves are held closed by that pressure. At this time, piston 50 is moving up in cylinder 49 because piston 13 and cam 14 are moving to the left in FIG. 1. Cylinder 49 is thus being filled with low pressure fluid. In brief summary of this much of the operation, piston 16 is pumping fluid through motor 39 causing the motor to do shaft work and the fluid is continuing on under a lowered pressure to fill cylinder 49 to make it ready to do the same when the steam piston 13 is on its left to right stroke. Piston 50 moves up as steam piston 13 moves right to left because cam face 51 is shaped to allow cam follower 52 to move up as low pressure fluid pushes against piston 50.

As steam piston 13 moves to the left in expander cylinder 9, spent steam in cylinder volume 38 is forced out through port 27, into outlet manifold 52 and into condenser 53. The condensed exit steam is pumped as a liquid by pump 54 back into boiler 3.

When steam piston 13 arrives at the leftward position in expander cylinder 9, inlet valve 33 opens port 26 because slide 10 has moved to a position causing the protrusion shown to push valve 33. At this new leftward position of valve slide 10 (this position not shown in FIG. 1) steam from boiler 3 enters port 26 and pressurizes the left cavity 38 of cylinder 9. Piston 13 then moves in a rightward direction as the steam expands in cavity 38. Piston rod 15 then pushes cam 14 from its then leftward position (not shown) to the right. During this left-to-right stroke piston 50 is forced downward in cylinder 49 in the same manner as piston 16 was forced upward in cylinder 17 during the stroke in the other direction as described before. When the steam piston first starts its left-to right stroke, piston 16 starts down and hydraulic pressure in cylinder 17 drops off in intensity rapidly. This drop in pressure in cylinder 17 causes check valve 21 to close, because back pressure from accumulator 22 overcomes it. Thus accumulator 22 does not lose pressure back to cylinder 17. Meanwhile, still during the left-to-right stroke of steam piston 13 and simultaneous downward stroke of piston 50, high pressure fluid from cylinder 49 flows through check valve 47 and into accumulator 22 and on to the motor 39, if valve 23 is still held open by the operator. This time it is cylinder 17 which is being filled with low pressure fluid from accumulator 43 flowing through check valve 48 but not through check valve 46 or 21 because this return fluid's pressure is too low to open check valves 46 and 21 against the high pressure on the other side. Nor does this low pressure working fluid pass through check valve 45 because of the higher pressure on its outlet side.

In the mode of operation, two strokes of which were described above, when "motor-operate" valves 23 and 24 are held open and the motor 39 caused to run, piston 13 will continue to reciprocate drawing steam from boiler 3 and alternately pressurizing fluid in first cylinder 17, then 49 and thus maintaining pressure in accumulator 22, even though fluid flows through motor 39. A pressure sensor 54 in accumulator 22 is connected to impulse line 55 which is connected to steam valve 7. The pressure sensor 54 is preset at a desired hydraulic fluid working pressure, say 4,000 psi. Sensor 54, impulse line 55 and valve 7 work in the normal feed back loop control action so that as motor demand of fluid out of accumulator 22 lowers accumulator 22 pressure, below say 4,000 psi, valve 7 opens more, throttling more steam to expander 9 and causing hydraulic cylinders 17 and 49 to deliver more hydraulic fluid to accumulator 22. Conversely, when pressure in accumulator 22 exceeds its set point, of say 4,000 psi, by a small amount, such as is caused by the operator closing or partially closing valves 23/24, an impulse in line 55 causes steam valve 7 to be closed and the reciprocating action of piston 13 slows or stops.

Upon restart of the steam piston, as when pressure in accumulator 22 is lowered and valve 7 opens, it may be that piston 13 is positioned in its stroke with both inlet valves 32 and 33 closed. In this case in order to start the action, steam from line 56 will enter one or the other ends of expander 9 by passing through either valve 57 or 58 depending on the direction piston 13 was last moving. Exist valve slide 25 moves, as was described above, a small amount left and then right as piston 13 reaches each end of its stroke and upon this movement valves 57 and 58 are either held open or allowed to remain normally closed alternately. In FIG. 1, valve 57 is open and steam enters the small port shown in chamber 11. It can be seen from FIG. 1 that steam flows into either chamber 11 or 38 only when piston 13 is on a power stroke using that side of the piston. The amount of steam entering through valve 57 (or 58 in its turn) is relatively small compared to the amount entering through ports 12 (and 26) and is mainly to slowly start a stopped piston upon start-up. The steam that does enter through bleed valves 57 and 58 does work during the power strokes and is never wasted.

Next will be described the mode of operation in which the kinetic energy of a coasting down but moving vehicle in which the present power system is installed, is converted back into stored energy in the system shown in FIG. 1. In this mode of operation, the operator of the vehicle has closed valves 23 and 24, preventing any further flow of working fluid from the high pressure accumulator 22 and preventing any further flow of working fluid to low pressure accumulator 43. Note that in this mode, valve 7 will close and in turn valve 6 will close, because both steam pressure at 4 and hydraulic pressure at 54 will quickly reach cut off set point of the controls as described previously. Therefore, no further usage of fuel and no motion of the expander will take place.

In the above slowing down mode, hydraulic motor 39 will be driven by the turning wheel or wheels of the vehicle and act as a pump. The pump action of 39 forces working fluid through check valve 40 into accumulator 22. Check valve 40 is spring loaded to open in the direction indicated when the pressure on its inlet exceeds the pressure on its outlet side. The motor 39, acting as a pump, is capable of delivering fluid at a pressure considerably in excess of previous accumulator 22. For example, if working fluid pressure in accumulator 22 has been set at 4,000 psi, motor 39, when powerfully driven through its shaft as a pump, will develop outlet pressures of 5,000 psi. As the motor 39 runs as a pump, hydraulic fluid enters the top line of the motor from accumulator 43 by flowing through check valve 45. This mode of operation is now pumping working fluid from accumulator 43 at a low pressure into accumulator 22 at a high pressure thereby storing energy for use later as demanded by operator. The capacity of accumulators 43 and 22 are approximately equal in volume of fluid capable of being held therein. When the present invention is to be used in the energy recovery from a coasting down vehicle mode, as is being described, the size of accumulators 22 and 43 are large enough to store enough energy to later accelerate the vehicle to 20 or 30 miles per hour. This volume is from one to several cubic feet at 2,000 psi to 5,000 psi.

During energy recovery coasting mode it frequently occurs that accumulator 22 reaches its highest limiting pressure and can hold no more fluid. A preselected pressure of, for example, 1,000 psi over accumulator's 22's normal working pressure, described earlier in the working mode, is selected as a highest limit for accumulator 22. Check valve 41 has been previously set by its spring load to open at this preselected pressure, for example, 5,000 psi. When this pressure is reached and motor 39 continues to operate as a pump, being driven as it is from the propelling wheels of the coasting vehicle to which it is connected, working fluid will then circulate through check valve 41, cooling coil 42 and motor 39.

If vehicle, wheels and motor 39 come to a stop, a static pressure of the preset value, mentioned above, will be maintained in accumulator 22, in lines connecting valve 40 to valve 41, in the motor 39, and in lines connecting 45 to valve 41 by way of cooling coil 42.

Returning now to the power demand mode, the operator opens valve 23 and 24 simultaneously allowing high pressure fluid from accumulator 22 to drive motor 39. Only after pressure in accumulator 22 had been depleted to an intensity below transducer 54 set point, will valve 7 open and start expander piston 13 in motion. This period of time, when the stored pressure in accumulator 22 which may be, for example, 5,000 psi, is decreasing to a pressure equal to transducer 54 set point, for example, 4,000 psi, is enough to return the stored energy, built up from the coasting mode to the motor, and accelerate the vehicle into motion without calling on boiler 3 to deliver any energy. Eventually, valve 7 does open and the system returns to the power mode described previously.

Figure 2:
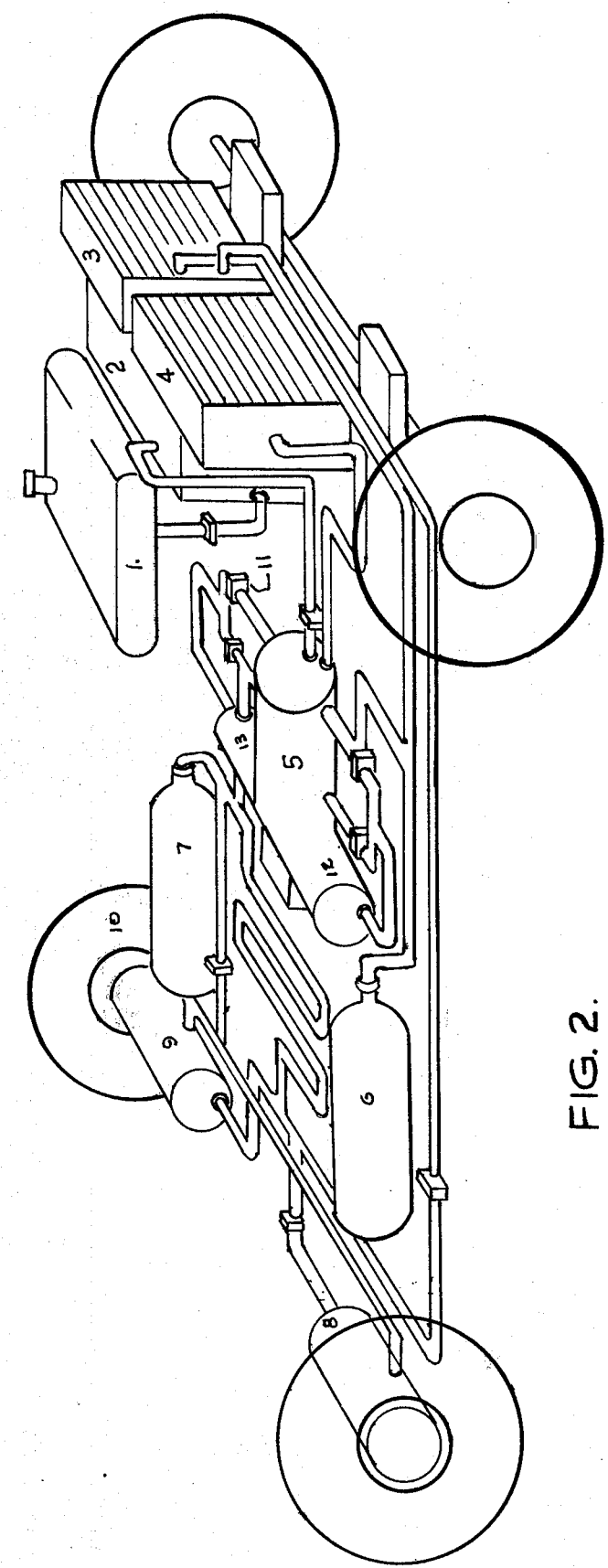
FIG. 2 is a pictorial skeleton view of the various components arranged in a land vehicle in a fashion to propel it.

The components of this power system can be, in one embodiment of this invention, arranged in a land vehicle, as shown in FIG. 2. In FIG. 2 air to fluid heat exchanger 3 is located as shown at the front of the vehicle. Beside this heat exchanger is steam condenser 4 located where it can receive a flow of air for cooling purposes. Boiler 2, with its burner underneath, is shown also near the front of the vehicle and under its fuel tank 1. Expander 5 and associated mechanical linkage to hydraulic motors, 8 and 9, are shown shafted on each to the rear wheels, 10. Accumulators 6 and 7 are shown as cylindrical containers lying flat at the frame level of the vehicle. Exact valving and connecting lines, used in FIG. 1, are not shown in FIG. 2. In FIG. 2, element 11 illustrates a valve or control element in the lines.

In a vehicle, utilizing the power plant of this invention, the auxiliary power needs such as electric generator for battery and lights, cooling fans, pumps, etc, are driven by small hydraulic motors feeding off of the main accumulator 7 in FIG. 2.

Figures 3, 4:
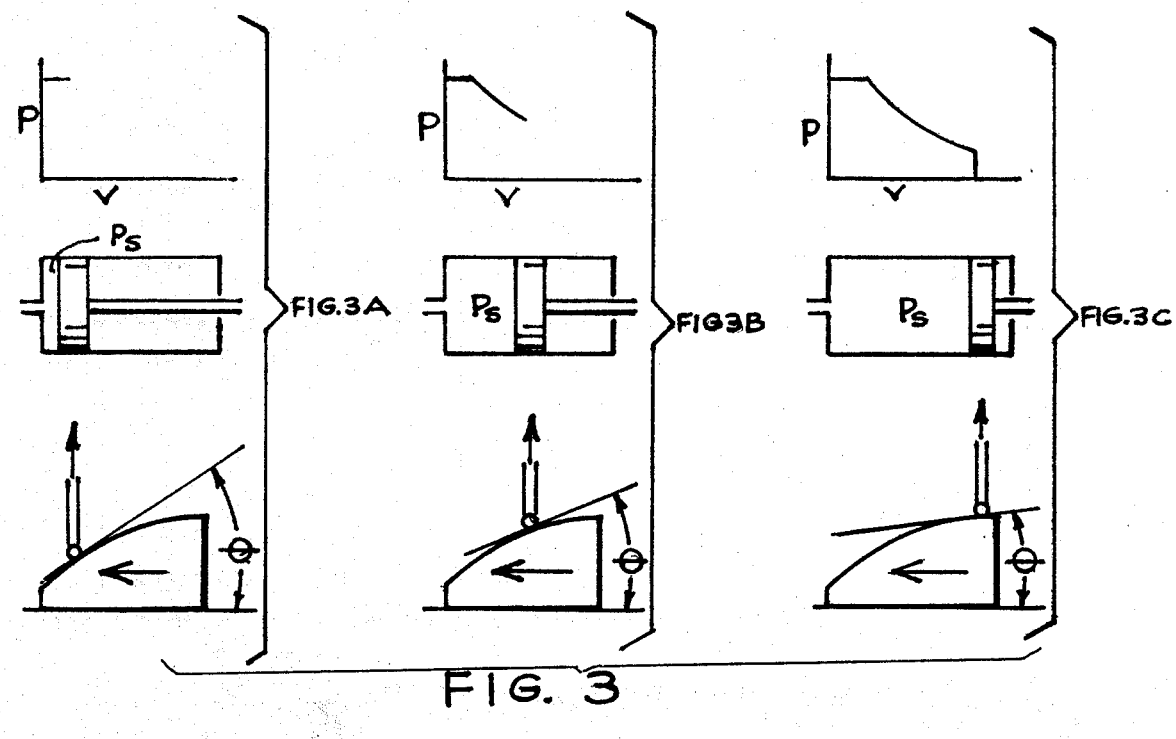
FIG. 3 shows a schematic example of the method of transfer cam design to effect a constant hydraulic pressure under conditions of decaying steam pressure as encountered in operation of the device shown in FIG. 1.
FIG. 4 shows a table with cam positions a, b and c as shown in FIG. 3.

The method of contouring cam 14 of FIGS. 3-4 is best described by reference to FIG. 3. It is seen in FIG. 3 that the tangent angle of the cam at the follower contact point is higher at position a than b, and higher at b than at c. As the steam piston moves to the right in FIG. 3 the steam pressure $P_s$ decreases ideally according to the gas law $PV = C$, where P is pressure, V is volume and C is the gas constant. However, since the expansion of the steam is not ideal due to deviation from adiabatic conditions necessary in a practical situation, the actual pressure-volume diagram is obtained by instrumentation of the cylinder in the usual manner such as by a steam indicator or by pressure transducers and linear displacement transducers feeding an YX recorder.

Having determined the steam pressure at various positions of the steam piston, the corresponding steepness of the cam at those positions necessary to maintain a constant hydraulic pressure in a cylinder whose piston is driven by the cam follower is determined by the following formula:

$$\theta = \arctan (A_s P_s)/(A_h P_h)$$

in which $\theta$ is the angle of a tangent line drawn at the cam follower contact point as shown in FIG. 3.

$A_s$ is the area of the steam piston.
$P_s$ is the steam pressure at the position in question.
$A_h$ is the area of the hydraulic piston driven by the cam.
$P_h$ is the desired constant hydraulic pressure to be pumped.

The table shown in FIG. 4 illustrates the use of the formula for three points on the cam corresponding roughly to the beginning (a), middle (b), and end (c) of a steam expansion stroke. An area of 5 square inches has been selected in this example as the size of the steam piston, an area of 1 square inch has been selected as the size of the hydraulic piston and a constant hydraulic pressure of 3,000 psi has been selected. A starting steam pressure of 300 psi has been selected and it has been assumed that at position b the steam pressure has fallen to 210 psi and that at position c the steam pressure has further expanded to 95 psi. Using the formula $$\theta = \arctan (A_s P_s)/(A_h P_h)$$

to work across the table, the method gives cam angles of 26.6°, 19.3°, and 10.8° respectively for points a, b and c on the cam. When contouring a complete cam for use in this invention a large number of such position points is selected and a table as shown in FIG. 4 is worked out containing as many as one point for each one-eighth inch of cam travel, thereby when physically contoured from steel or hard metal a smooth curve is approximated for the cam follower to ride on.

We claim:
1. A hydraulically coupled engine comprising:
a first piston inside a bored cylinder, valve means for allowing pressurized steam to enter and exit said cylinder,
a rod with one end connected to first piston and the other end connected to a solid curvilinear cam shaped block with
two contoured surfaces each on a different side of the block and each a reverse curve of the other, each said surface contacting one of a pair of second piston rods at each said second piston rod's end, a pair of second pistons disposed reciprocably inside second opposed cylinders which are fixedly disposed laterally with respect to said block, each said second piston connected to a respective second piston rod for reciprocable movement therewith, said second pistons thereby acting alternately in said opposed cylinders, said second cylinders each being smaller in diameter than said first cylinder and each second cylinder containing hydraulic fluid,
a valve means for delivering said hydraulic fluid to a pressure accumulator,
a hydraulic motor connected to fluid carrying conduit means at its input side to said pressure accumulator and said motor connected at its output side by fluid carrying conduit means to said second cylinders.
wherein said surfaces each have a length substantially equal in length to the stroke length of said first piston and each said surface is curved to form a contact angle $\phi$ with the second piston rod which it contacts at any point along the curvilinear block's rectilinear travel substantially according to the formula for the contact angle

$$\phi = \arctan (A_s P_s)/(A_h P_h)$$

in which
$A_s$ = the circular piston face area of the said first piston,
$P_s$ = the steam pressure on said first piston face at the position whose contact angle is being calculated,
$A_h$ = the circular piston face area of the said respective second piston, and
$P_h$ = a selected hydraulic pressure of the respective second cylinder.

* * * * *

UNITED STATES PATENT AND TRADEMARK OFFICE
CERTIFICATE OF CORRECTION

PATENT NO. : 4,347,701
DATED : September 7, 1982
INVENTOR(S) : Fletcher C. Eddens et al.

It is certified that error appears in the above-identified patent and that said Letters Patent is hereby corrected as shown below:

On the title page, delete Item (73) and Attorney, Agent, or Firm – Frishauf, Goodman and Woodward.

Signed and Sealed this

*Twenty-second* Day of *November 1983*

[SEAL]

*Attest:*

GERALD J. MOSSINGHOFF

*Attesting Officer*     *Commissioner of Patents and Trademarks*